(12) United States Patent
Nishikawa et al.

(10) Patent No.: US 9,337,682 B2
(45) Date of Patent: May 10, 2016

(54) CHARGING CONTROL DEVICE, SOLAR POWER GENERATION SYSTEM AND CHARGING CONTROL METHOD

(71) Applicant: OMRON CORPORATION, Kyoto (JP)

(72) Inventors: Takeo Nishikawa, Kyoto (JP); Wataru Okada, Kyoto (JP); Junichiro Yamada, Kyoto (JP); Makoto Ohashi, Kyoto (JP); Yoshinori Sunahata, Shiga (JP)

(73) Assignee: OMRON CORPORATION, Kyoto (JP)

( * ) Notice: Subject to any disclaimer, the term of this patent is extended or adjusted under 35 U.S.C. 154(b) by 27 days.

(21) Appl. No.: 14/348,640

(22) PCT Filed: Nov. 20, 2012

(86) PCT No.: PCT/JP2012/080024
§ 371 (c)(1),
(2) Date: Mar. 31, 2014

(87) PCT Pub. No.: WO2013/080835
PCT Pub. Date: Jun. 6, 2013

(65) Prior Publication Data
US 2014/0253014 A1 Sep. 11, 2014

(30) Foreign Application Priority Data

Nov. 30, 2011 (JP) ................................. 2011-262052

(51) Int. Cl.
*H01M 10/44* (2006.01)
*H01M 10/46* (2006.01)
(Continued)

(52) U.S. Cl.
CPC . *H02J 7/007* (2013.01); *H02J 3/32* (2013.01); *H02J 7/35* (2013.01); *H02J 3/385* (2013.01); *Y02E 10/566* (2013.01); *Y02E 10/58* (2013.01); *Y02E 70/30* (2013.01)

(58) Field of Classification Search
CPC .......................................................... H02J 7/35
USPC .......................................................... 320/101
See application file for complete search history.

(56) References Cited

U.S. PATENT DOCUMENTS

2004/0207366 A1 10/2004 Sung
2007/0137688 A1 6/2007 Yoshida
(Continued)

FOREIGN PATENT DOCUMENTS

JP 10-042484 2/1998
JP 2008-090672 4/2008
(Continued)

OTHER PUBLICATIONS

International Search Report in PCT/JP2012/080024, mail date is Dec. 18, 2012, together with English language translation thereof.
(Continued)

*Primary Examiner* — Suresh Memula
(74) *Attorney, Agent, or Firm* — Greenblum & Bernstein, P.L.C.

(57) ABSTRACT

The present disclosure relates to a charging control device, a solar power generation system and a charging control method which allow more efficient charging. The charging control device includes: a charging converter which takes electric power out of a solar panel and converts the electric power to a voltage required for charging a storage battery; and a controlling CPU which adjusts an output voltage that is outputted from the charging converter. The charging converter takes electric power out of the solar panel at two operation points where the electric power can be taken out of the solar panel with a certain output voltage, and charges the storage battery. The controlling CPU adjusts the output voltage in accordance with a voltage difference between input voltages respectively corresponding to the two operation points. The present technique is applicable, for example, to the charging control device of the solar power generation system.

8 Claims, 11 Drawing Sheets

(51) Int. Cl.
  *H02J 7/00* (2006.01)
  *H02J 7/35* (2006.01)
  *H02J 3/32* (2006.01)
  *H02J 3/38* (2006.01)

(56) References Cited

U.S. PATENT DOCUMENTS

2009/0266631 A1    10/2009    Kikuchi
2009/0302681 A1*   12/2009    Yamada ................ H02J 7/35
                                                        307/46
2011/0074337 A1*   3/2011     Adachi ............... H01M 10/465
                                                        320/101
2011/0089886 A1*   4/2011     Dubovsky ............. H02J 7/35
                                                        320/101
2012/0235623 A1*   9/2012     Ishino ................ H01M 10/44
                                                        320/101
2012/0319640 A1*   12/2012    Park .................... G05F 1/67
                                                        320/101
2015/0015179 A1*   1/2015     Yamada ............... H01M 10/44
                                                        320/101

FOREIGN PATENT DOCUMENTS

WO    2005/045547    5/2005
WO    2007/132929    11/2007

OTHER PUBLICATIONS

European Search Report, mailed May 15, 2015, in European Patent Application No. 12853935.0.

* cited by examiner

Voltage current curve of solar panel

Voltage current curve of storage battery

CHARGING CONTROL DEVICE, SOLAR POWER GENERATION SYSTEM AND CHARGING CONTROL METHOD

BACKGROUND

1. Field

The present disclosure relates to a charging control device, a solar power generation system and a charging control method, and especially relates to a charging control device, a solar power generation system and a charging control method which allow more efficient charging.

2. Related Art

In recent years, there has been an increasing demand for a solar power generation system configured of a solar panel and a storage battery in combination, for using natural energy, or coping with the disaster. In a typical solar power generation system, there occurs a time zone in which supply of electric power generated by a solar panel does not agree with demand for electric power consumed by a load, and it is necessary to perform electric power control that uses a storage battery.

Further, some techniques for charging from the solar panel to the storage battery have been proposed. For example, Unexamined Japanese Patent Publication No. H10-42484 discloses a charging device that performs charging by switching between charging with a large current in accordance with a voltage difference between a voltage inputted from the solar panel and a voltage of the storage battery and charging with a smaller current than the large current.

SUMMARY

In the conventional solar power generation system, the following converters have been used at the time of performing charging from the solar panel to the storage battery: a converter that performs MPPT (Maximum Power Point Tracking) control such that electric power that can be taken out of the solar panel becomes maximum; and a converter that performs charging with a voltage in accordance with a state of charge (SOC) of the storage battery. With the configuration as described above where a voltage is converted twice by use of the two converters, a conversion loss occurs in each converter, and it has been difficult to perform effective charging.

The present disclosure is one made in view of such circumstances, as well as one allowing more efficient charging.

One aspect of a charging control device of the present disclosure includes: a conversion unit configured to take electric power out of an electric power generation unit that generates electric power, and configured to convert the electric power to a voltage required for charging a storage battery; and an adjustment unit configured to adjust an output voltage that is outputted from the conversion unit. The conversion unit takes electric power out of the electric power generation unit at two operation points where the electric power can be taken out of the electric power generation unit with the output voltage, and charges the storage battery, and the adjustment unit adjusts the output voltage in accordance with a voltage difference between input voltages respectively corresponding to the two operation points.

One aspect of a solar power generation system of the present disclosure includes: a conversion unit configured to take electric power out of a solar panel that generates electric power in accordance with irradiation with sunlight, and configured to convert the electric power to a voltage required for charging a storage battery; and an adjustment unit configured to adjust an output voltage outputted from the conversion unit. The conversion unit takes electric power out of the solar panel at two operation points where the electric power can be taken out of the solar panel with the output voltage and charges the storage battery, and the adjustment unit adjusts the output voltage in accordance with a voltage difference between input voltages respectively corresponding to the two operation points.

One aspect of a charging control method for a charging control device which includes: a conversion unit configured to take electric power out of an electric power generation unit that generates electric power, and configured to convert the electric power to a voltage required for charging a storage battery; and an adjustment unit configured to adjust an output voltage that is outputted from the conversion unit, the method comprising steps where the conversion unit takes electric power out of the electric power generation unit at two operation points where the electric power can be taken out of the electric power generation unit with the output voltage and charges the storage battery, and the adjustment unit adjusts the output voltage in accordance with a voltage difference between input voltages respectively corresponding to the two operation points.

In the aspect of the present disclosure, electric power is taken out at two operation points where it can be taken out with a certain output voltage, and charges the storage battery, and the output voltage is adjusted in accordance with a voltage difference between input voltages respectively corresponding to the two operation points.

According to one aspect of the present disclosure, it is possible to more efficiently perform charging.

DETAILED DESCRIPTION

Hereinafter, specific embodiments applied with the present technique will be described in detail with reference to the drawings.

First, a concept of a charging control method applied with the present technique will be described with reference to FIGS. 1A and 1B to FIGS. 4A and 4B.

Figure 1A:
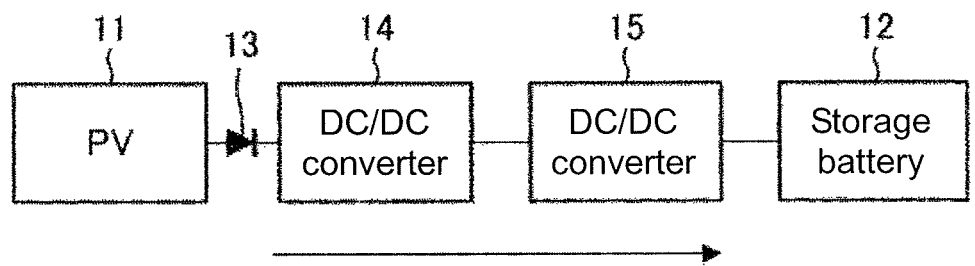
FIGS. 1A and 1B are diagrams explaining a concept of a charging control method applied with the present technique.

FIG. 1A shows a conventional solar power generation system in a simplified manner. The conventional solar power generation system is configured by connecting rectifier 13, DC/DC (Direct Current/Direct Current) converter 14 and DC/DC converter 15 in series between solar panel (PV: Photovoltaic) 11 and storage battery 12.

Electric power generated in solar panel 11 is rectified in rectifier 13 and inputted into DC/DC converter 14. DC/DC converter 14 performs MPPT control which is to perform DC/DC conversion such that electric power that can be taken out of solar panel 11 becomes maximum, and supplies DC/DC converter 15 with the electric power taken out of solar panel 11. DC/DC converter 15 performs DC/DC conversion on the electric power outputted from DC/DC converter 14 such that a voltage becomes optimal for charging storage battery 12 in accordance with a state of charge of electric power charged in storage battery 12. Then, DC/DC converter 15 supplies storage battery 12 with the electric power to perform charging.

As thus described, in the conventional solar power generation system, DC/DC converter 14 and DC/DC converter 15 have been used and DC/DC conversion has been performed twice.

Figure 1B:
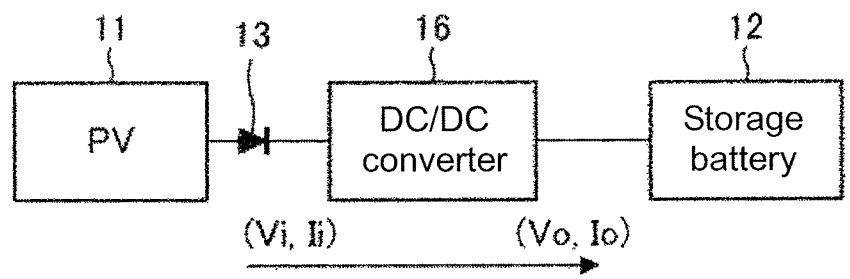

On the other hand, FIG. 1B shows in a simplified manner a solar power generation system that adopts a charging control method applied with the present technique. As shown in FIG. 1B, this solar power generation system is configured by connecting rectifier 13 and DC/DC converter 16 in series between solar panel 11 and storage battery 12.

DC/DC converter 16 appropriately adjusts an optimal voltage for charging storage battery 12 in accordance with a state of charge of electric power charged in storage battery 12. Then DC/DC converter 16 supplies storage battery 12 with electric power taken out of solar panel 11 with a voltage in the vicinity of one with which electric power that can be taken out of solar panel 11 becomes maximum. Accordingly, in the solar power generation system that adopts the charging control method applied with the present technique, as compared with the conventional one, it is possible to efficiently perform charging only by means of DC/DC converter 16. Hence it is possible to reduce the device in size and also seek for reducing cost.

It is to be noted that in the following description, as shown in FIG. 1B, a voltage of electric power inputted from solar panel 11 into DC/DC converter 16 is referred to as input voltage Vi, and a current at that time is referred to as input current Ii. Further, a voltage of electric power outputted by DC/DC converter 16 to storage battery 12 is referred to as output voltage Vo, and a current at that time is referred to as output current Io. Then, conversion efficiency η of DC/DC converter 16 is expressed by the relation of: output voltage Vo×output current Io==conversion efficiency η×input voltage Vi×input current Ii.

FIGS. 2A and 2B to FIGS. 4A and 4B show voltage current curves of solar panel 11 and storage battery 12.

Figure 2A:
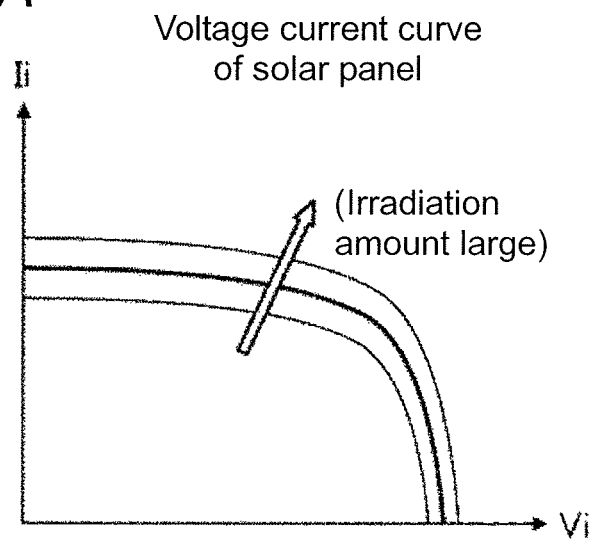
FIGS. 2A and 2B are diagrams showing voltage current curves of a solar panel and a storage battery.

In FIG. 2A, a horizontal axis shows input voltage Vi which is inputted from solar panel 11 into DC/DC converter 16, and a vertical axis shows input current Ii which is inputted from solar panel 11 into DC/DC converter 16. Then FIG. 2A shows a voltage current curve expressing the relation between a current and a voltage of electric power that can be taken out of solar panel 11 by DC/DC converter 16.

That is, it is possible to take electric power out of solar panel 11 at an arbitrary operation point on such a voltage current curve that input current Ii gently decreases in accordance with increase in input voltage Vi. Further, the voltage current curve changes in accordance with an irradiation amount of sunlight, with which solar panel 11 is irradiated. When the irradiation amount of the sunlight increases, the electric power that can be taken out of solar panel 11 by DC/DC converter 16 increases such that the voltage current curve is shifted in an upper right direction.

Figure 2B:
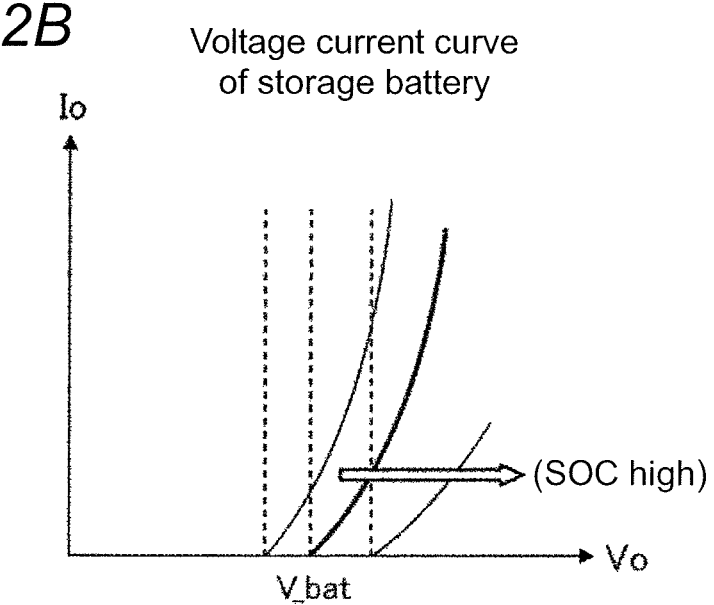

In FIG. 2B, a horizontal axis shows output voltage Vo of the electric power outputted by DC/DC converter 16 to storage battery 12, and a vertical axis shows output current Io of the electric power outputted by DC/DC converter 16 to storage battery 12. Then FIG. 2B shows a voltage current curve expressing the relation between a current and a voltage of electric power that can be outputted by DC/DC converter 16 in accordance with the state of charge of storage battery 12.

That is, as for the electric power outputted by DC/DC converter 16, output current Io is 0 when voltage V_bat of storage battery 12 agrees with output voltage Vo. Then, electric power is outputted from DC/DC converter 16 along such a voltage current curve that output current Io abruptly increases in accordance with increase in output voltage Vo. Further, when the SOC of becomes high (i.e., when the voltage of the electric power charged in storage battery 12 increases) in accordance with the state of charge of storage battery 12, the electric power outputted by DC/DC converter 16 increases such that the voltage current curve is shifted in a right direction.

Figure 3A:
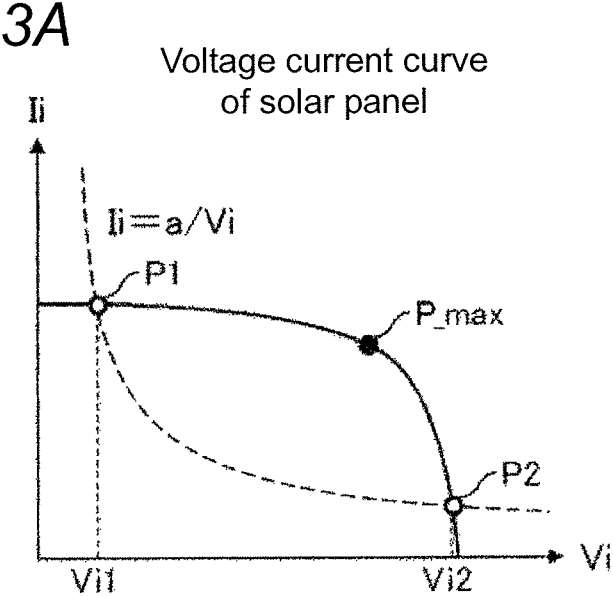
FIGS. 3A and 3B are diagrams showing voltage current curves of the solar panel and the storage battery.
Figure 3B:
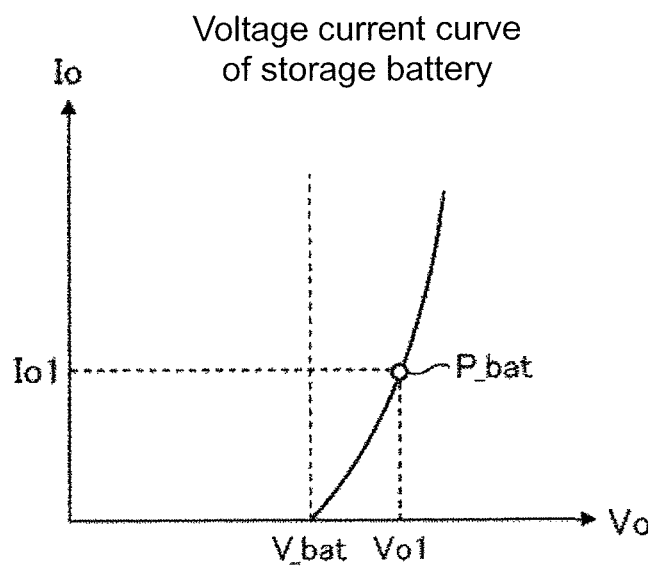

Here, as shown in FIG. 3B, when DC/DC converter 16 is set such that output voltage Vo of the electric power outputted by DC/DC converter 16 is output voltage Vo1, output current Io that flows (tries to flow) to storage battery 12 is unequivocally decided to be output current Io1 in accordance with the voltage current curve of storage battery 12. At this time, point P_bat on the voltage current curve of storage battery 12 becomes an operation point of storage battery 12.

Meanwhile, an operation point of solar panel 11 is a point that satisfies the relation of: input voltage Vi1×input current Ii1=output voltage Vo1×output current Io1/conversion efficiency η. That is, when variable a=output voltage Vo1×output current Io1/conversion efficiency η, the relation of: input current Ii1 =variable a/input voltage Vi1, holds. That is, as shown in FIG. 3A, intersection points between the voltage current curve of solar panel 11 and a curve shown by: input current Ii=variable a/input voltage Vi, become operation points P1 and P2 of solar panel 11. As thus described, when output voltage Vo of the electric power outputted by DC/DC converter 16 is decided, the operation points of solar panel 11 are restricted to two points, operation points P1 and P2.

Incidentally, maximum operation point P_max, where the electric power that can be taken out of solar panel 11 becomes maximum, is a point where input voltage Vi×input current Ii becomes maximum on the voltage current curve of solar panel 11. Therefore, when solar panel 11 is operated at operation point P1 or P2, it is not necessarily possible to take the maximum electric power out of solar panel 11.

Figure 4A:
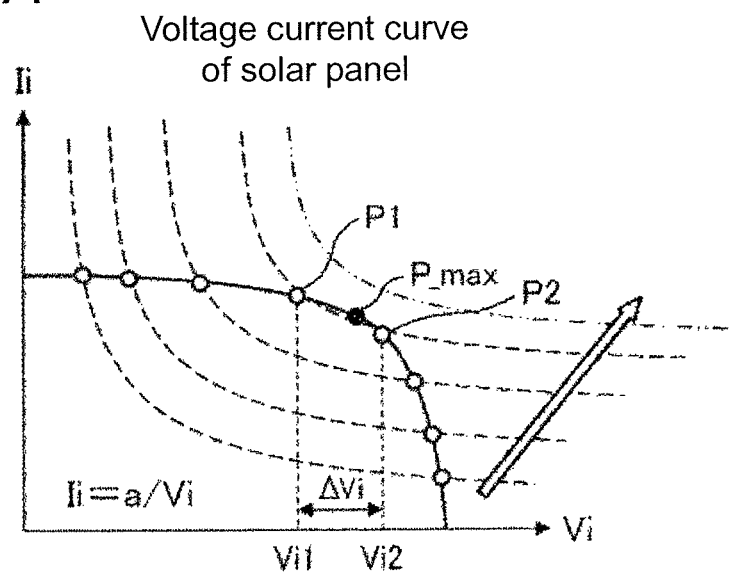
FIGS. 4A and 4B are diagrams showing voltage current curves of the solar panel and the storage battery.
Figure 4B:
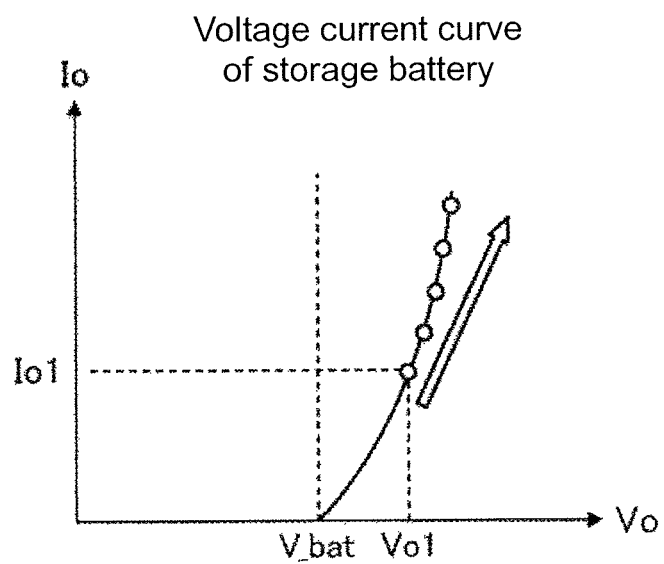

Then, for example as shown in FIG. 4B by means of an arrow filled in white, output current Io1 increases with output voltage Vo1 increased. This results in an increase in variable a (=output voltage Vo1×output current Io1/conversion efficiency η). Accordingly, as shown in FIG. 4A by means of an arrow filled in white, the curve shown by: input current Ii=variable a/input voltage Vi, is shifted in an upper right direction, and operation points P1 and P2 come close to maximum operation point P_max.

On the other hand, when output voltage Vo1 is excessively increased, the intersection point becomes non-existence between the voltage current curve of solar panel 11 and the curve shown by: input current Ii=variable a/input voltage Vi. In this case, DC/DC converter 16 cannot output a current required for charging storage battery 12, and hence the operation of solar panel 11 becomes unstable and output of DC/DC converter 16 abruptly decreases. Accordingly, it is necessary to control output voltage Vo so as to avoid the state where the intersection point does not exist between the voltage current curve of solar panel 11 and the curve shown by: input current Ii=variable a/input voltage Vi.

For example, DC/DC converter 16 scans the operation point of solar panel 11 in an intentionally large scale, and regularly switches and uses two operation points P1 and P2 where output voltage Vo becomes output voltage Vo1. Then, DC/DC converter 16 gradually increases output voltage Vo1, and determines that it is getting close to maximum operation point P_max with decrease in voltage difference ΔVi between input voltage Vi1 of operation point P1 and input voltage Vi2 of operation point P2. At this time, DC/DC converter 16 reduces the degree of increase in output voltage Vo1 or stops the increase in output voltage Vo1, to avoid the operation of solar panel 11 becoming unstable.

By means of such a control method, more efficient charging can be performed by one DC/DC converter 16.

Figure 5:
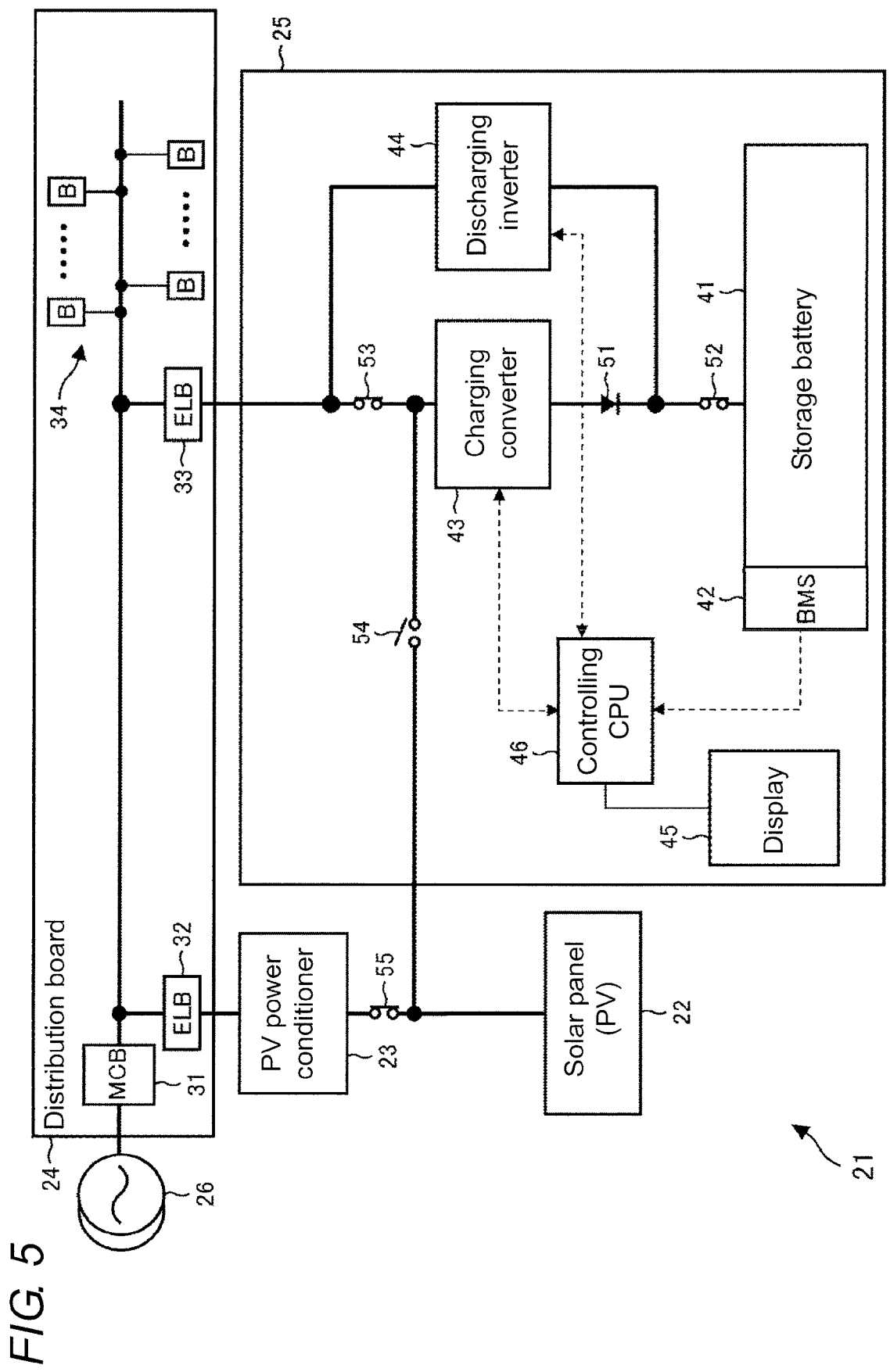
FIG. 5 is a block diagram showing a constitutional example of one embodiment of a solar power generation system applied with the present technique.

FIG. 5 is a block diagram showing a constitutional example of one embodiment of a solar power generation system applied with the present technique. It is to be noted that in the present specification, the system represents devices as a whole which are configured of a plurality of devices.

As shown in FIG. 5, solar power generation system 21 is configured including solar panel 22, PV power conditioner 23, distribution board 24 and charging control device 25. Distribution board 24 is connected with electric power system 26 for supplying electric power from a commercial power supply.

Solar panel 22 is a panel configured by connection of a plurality of solar cell modules, and generates electric power in accordance with an irradiation amount of sunlight.

PV power conditioner 23 adjusts electric power generated by solar panel 22, and performs DC/AC (Direct Current/Alternating Current) conversion on the electric power generated by solar panel 22, to output it to distribution board 24. Then, the electric power outputted from PV power conditioner 23 is, for example, allowed to reversely flow and sold to electric power system 26, or supplied to a load connected to distribution board 24.

Distribution board 24 is configured having circuit breaker (MCB: Molded Case Circuit Breaker) 31, leakage breakers (ELB: Earth Leakage Circuit Breaker) 32 and 33 and a plurality of breakers 34. In distribution board 24, electric power system 26 is connected via circuit breaker 31, PV power conditioner 23 is connected via leakage breaker 32, and charging control device 25 is connected via leakage breaker 33. Further, circuit breaker 31, leakage breaker 32 and leakage breaker 33 are connected to one another, and are connected with loads, not shown, via a plurality of breakers 34 connected to wiring that connect those.

Charging control device 25 is configured including storage battery 41, battery management system (BMS) 42, charging converter 43, discharging inverter 44, display 45 and controlling CPU (Central Processing Unit) 46.

Further, storage battery 41 and charging converter 43 are connected via rectification unit 51 and switch 52, and charging converter 43 and leakage breaker 33 of distribution board 24 are connected via switch 53. Moreover, discharging inverter 44 is connected in parallel with charging converter 43 between a contact point of rectification unit 51 and switch 52 and a contact point of switch 53 and leakage breaker 33. Furthermore, solar panel 22 and PV power conditioner 23 are connected via switch 55. A contact point between solar panel 22 and switch 55 and a contact point between charging converter 43 and switch 53 are connected via switch 54.

Storage battery 41 has a plurality of cells that store electric power, and electric power that is supplied from solar panel 22 or electric power system 26 via charging converter 43 is charged into each cell. Further, electric power charged in the cells of storage battery 41 is supplied to a plurality of loads (not shown) connected to distribution board 24 via discharging inverter 44.

Battery management system 42 manages a state of the plurality of cells in storage battery 41. For example, battery management system 42 measures a voltage, a current and a temperature of storage battery 41, and supplies controlling CPU 46 with results of the measurement.

According to control of controlling CPU 46, charging converter 43 performs DC/DC conversion on electric power generated by solar panel 22 to a voltage in accordance with the state of charge of storage battery 41, and supplies it to storage battery 41 to charge storage battery 41. Further, charging converter 43 performs AC/DC (Alternating Current/Direct Current) conversion on electric power supplied from electric power system 26 via distribution board 24, and supplies it to storage battery 41 to charge storage battery 41.

Discharging inverter 44 performs DC/AC conversion on electric power outputted from storage battery 41 and supplies it to the plurality of loads (not shown) connected to distribution board 24. It is to be noted that electric power from storage battery 41, DC/AC converted by discharging inverter 44, is controlled so as not to be outputted to electric power system 26.

Display 45 displays a variety of information in accordance with control of controlling CPU 46. For example, display 45 displays an amount of electric power generated by solar panel 22, a remaining amount of electric power charged in storage battery 41, and the like.

In accordance with the amount of electric power generated by solar panel 22, the remaining amount of electric power charged in storage battery 41, a time zone (e.g., daytime or nighttime) and the like, controlling CPU 46 controls each block in charging control device 25, to control charging or discharging of electric power.

For example, when electric power is generated by solar panel 22 and electric power is sufficiently charged in storage battery 41, controlling CPU 46 performs control so as to discharge the electric power of solar panel 22 and storage battery 41.

Figure 6:
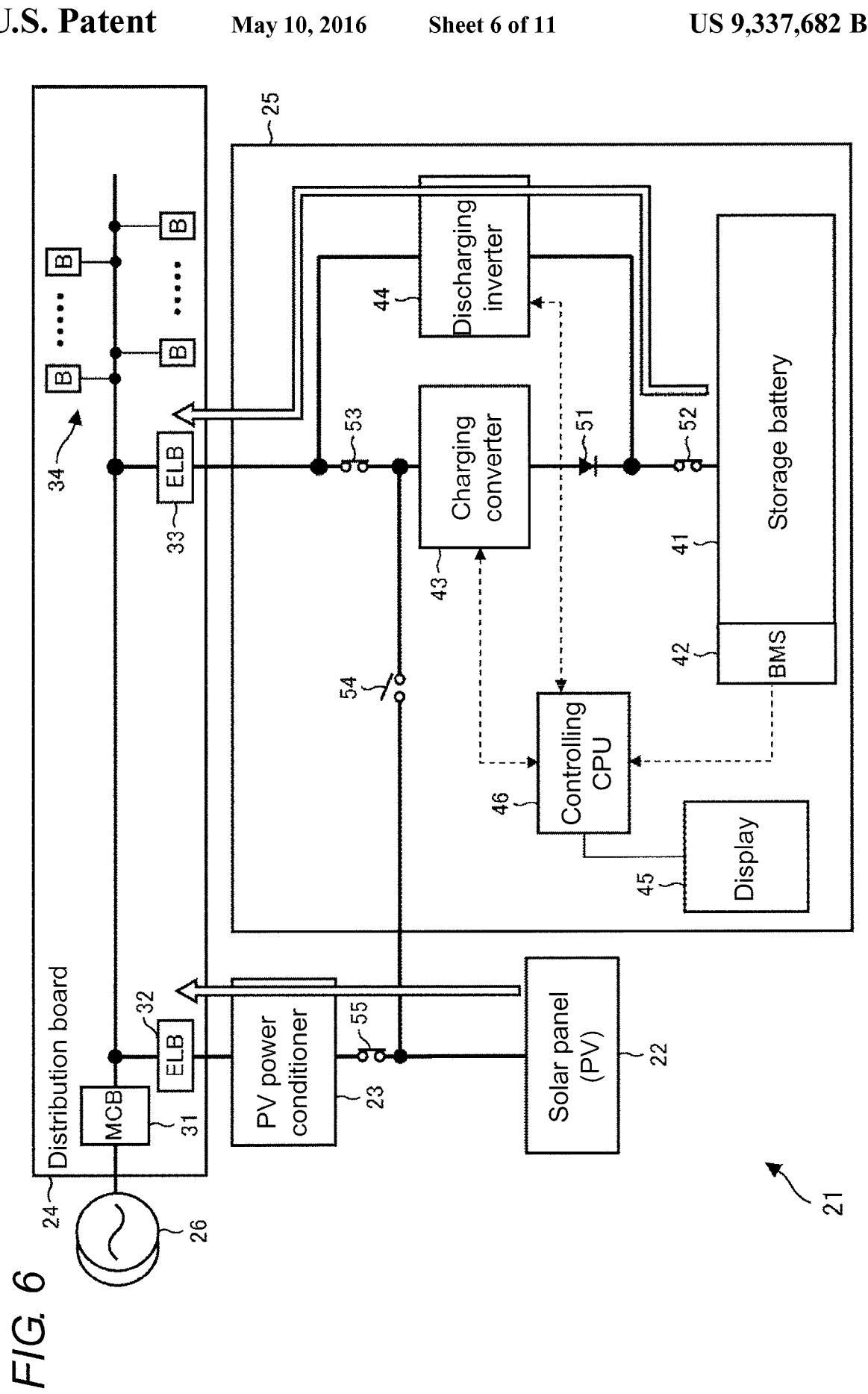
FIG. 6 is a diagram explaining a flow in the case of discharging electric power of the solar panel and the storage battery.

That is, as shown in FIG. 6, controlling CPU 46 performs such control as to turn on switch 55 while turning off switch 54, and supply PV power conditioner 23 with the electric power generated in solar panel 22. Further, at this time, controlling CPU 46 performs such control as to turn on switch 52 and activate discharging inverter 44 while stopping the operation of charging converter 43. Accordingly, the electric power generated in solar panel 22 is DC/AC converted by PV power conditioner 23 and supplied to distribution board 24, and the electric power charged in storage battery 41 is DC/AC converted by discharging inverter 44 and supplied to distribution board 24.

Further, for example, when electric power is not generated by solar panel 22 and electric power is not sufficiently charged in storage battery 41, controlling CPU 46 performs control so as to charge storage battery 41 with electric power supplied from distribution board 24 via charging converter 43.

Figure 7:
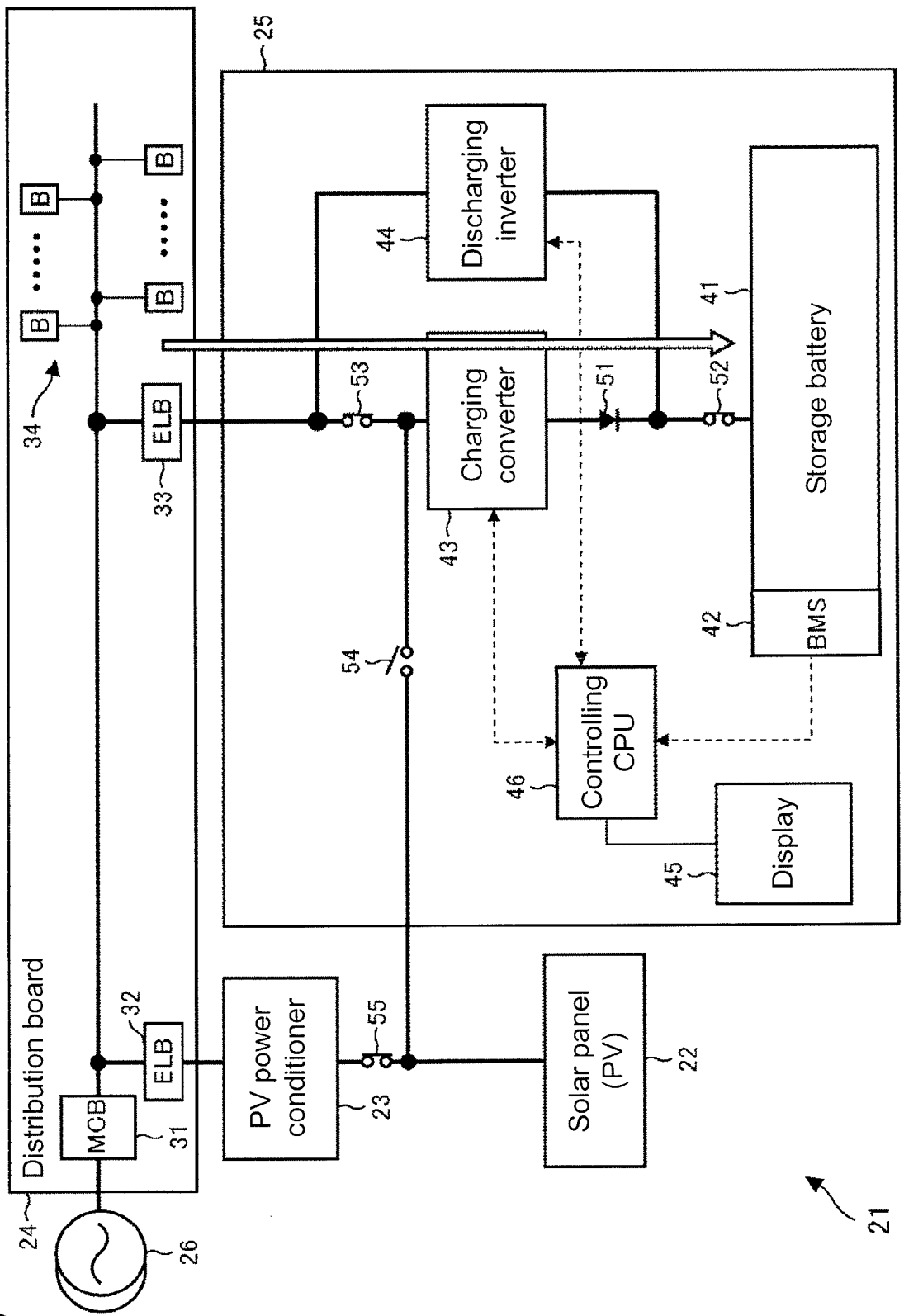
FIG. 7 is a diagram explaining a flow in the case of charging the storage battery with electric power from an electric power system.

That is, as shown in FIG. 7, controlling CPU 46 performs such control as to turn on switches 52 and 53 and activate charging converter 43 while stopping the operation of discharging inverter 44. Accordingly, the electric power supplied from electric power system 26 via distribution board 24 is AC/DC converted by charging converter 43 and charged into storage battery 41.

Further, for example, when electric power is generated by solar panel 22 and electric power is not sufficiently charged in storage battery 41, controlling CPU 46 performs control so as to charge into storage battery 41 the electric power generated in solar panel 22.

Figure 8:
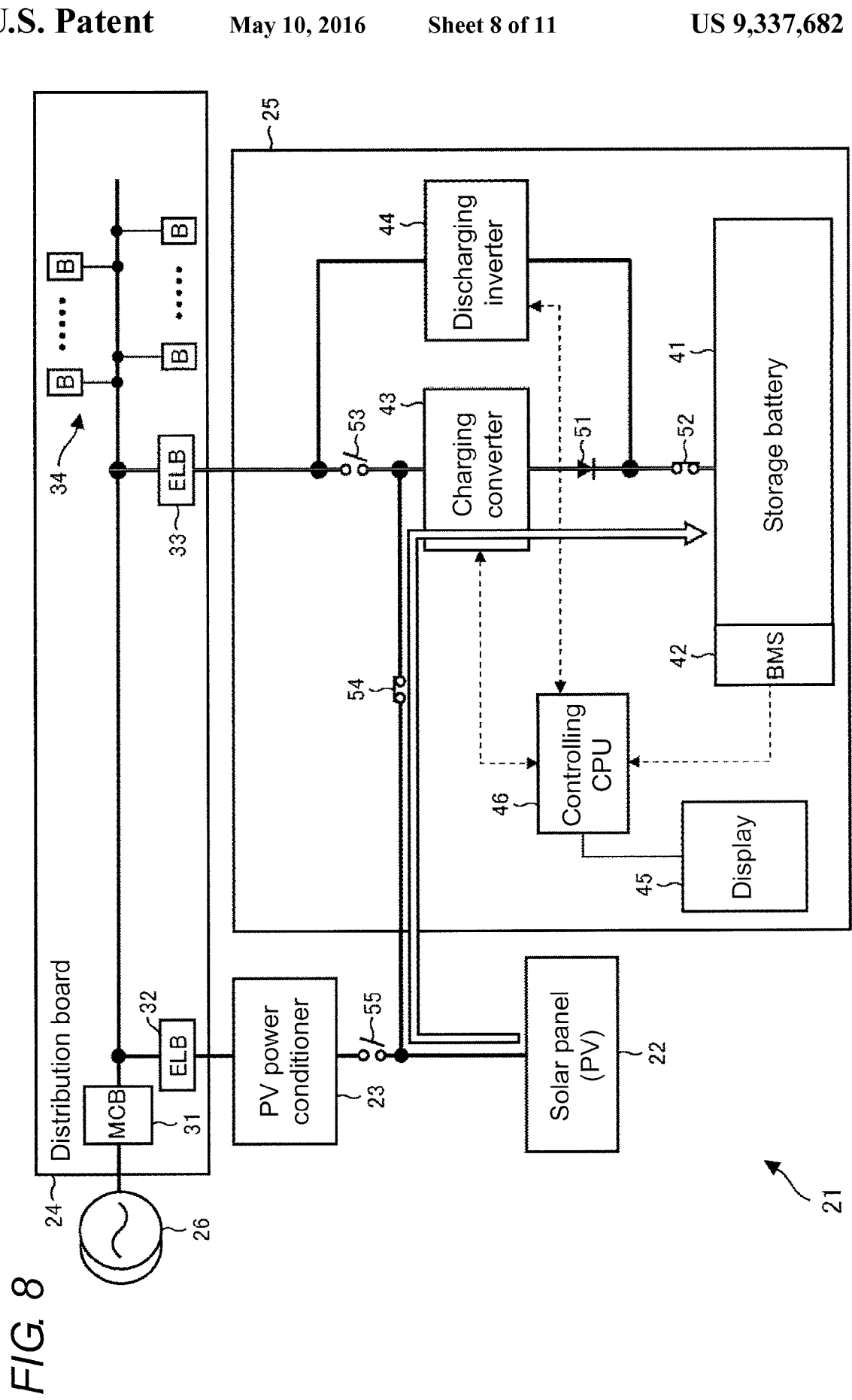
FIG. 8 is a diagram explaining a flow in the case of storing electric power, generated in the solar panel, into the storage battery.

That is, as shown in FIG. 8, controlling CPU 46 performs such control as to turn on switches 52 and 54 and turn off switches 53 and 55, and activate charging converter 43 while stopping the operation of discharging inverter 44. Accordingly, the electric power generated in solar panel 22 is DC/DC converted by charging converter 43 and charged into storage battery 41.

Here, in the case of charging into storage battery 41 the electric power generated in solar panel 22, as described with reference to FIG. 1B, a configuration is formed where one charging converter 43 is arranged between solar panel 22 and storage battery 41. Therefore, charging converter 43 and controlling CPU 46 charge storage battery 41 by such charging control method as described with reference to FIGS. 2A and 2B to FIGS. 4A and 4B. That is, charging converter 43 takes electric power out of solar panel 22 at two operation points P1 and P2 shown by the intersection points between the voltage current curve of solar panel 22 and the curve shown by: input current li=variable a/input voltage Vi. Controlling CPU 46 adjusts output voltage Vo1 in accordance with voltage difference ΔVi of input voltages corresponding to operation points P1 and P2.

Figure 9:
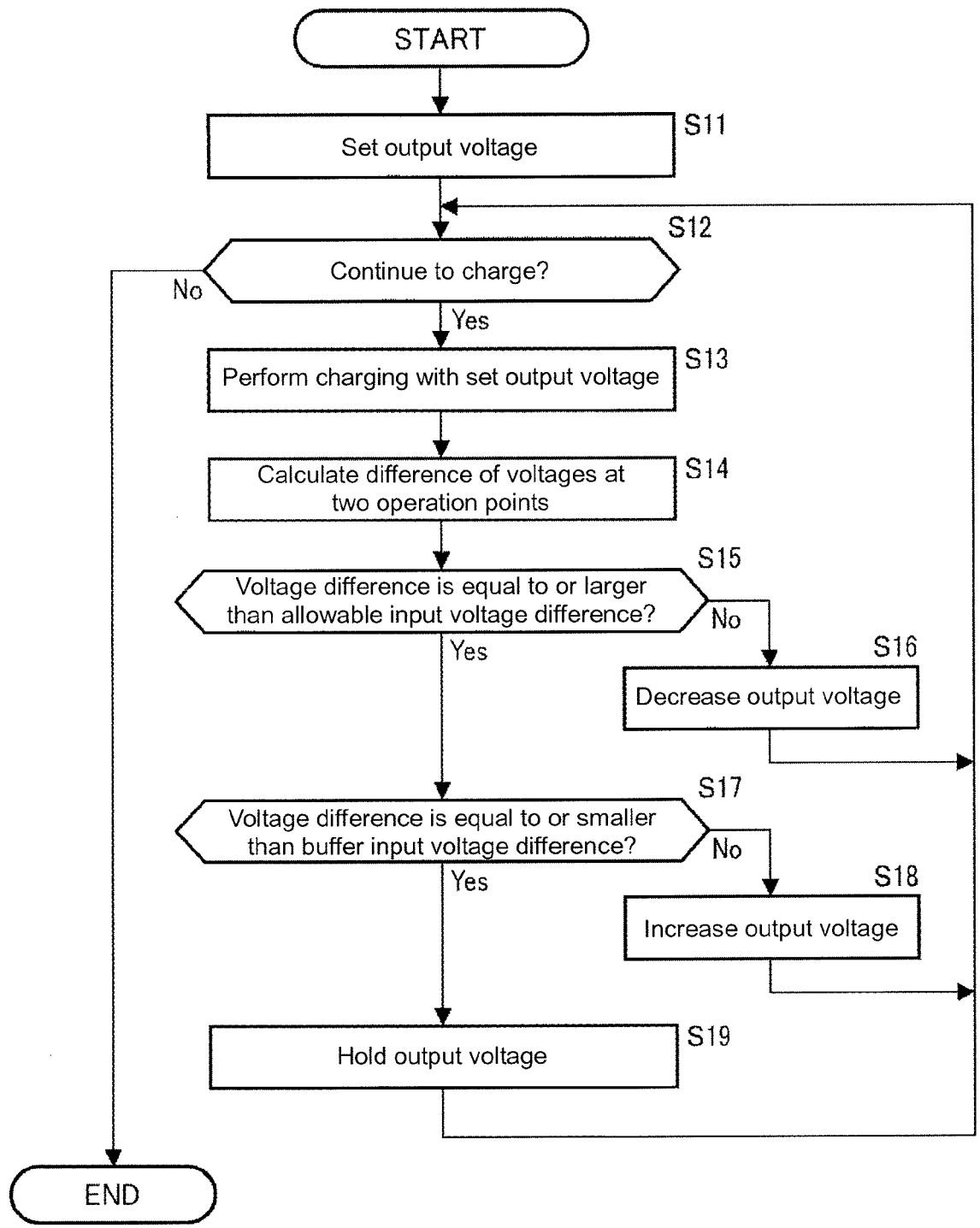
FIG. 9 is a flowchart explaining processing by a first charging method.

FIG. 9 is a flowchart explaining processing by a first charging method by means of charging converter 43.

Processing is started for example when controlling CPU 46 determines to charge into storage battery 41 the electric power generated in solar panel 22 based on the electric power generation state of solar panel 22 and the state of charge of storage battery 41.

In Step S11, controlling CPU 46 decides output voltage Vo1 which is outputted by charging converter 43 to storage battery 41, and sets it in charging converter 43. For example, based on a voltage in accordance with the state of charge of storage battery 41 which was measured by battery management system 42, controlling CPU 46 decides as output voltage Vo1 a voltage value that is slightly higher than that voltage.

In Step S12, controlling CPU 46 determines whether or not to continue to charge storage battery 41. For example, controlling CPU 46 determines not to continue to charge storage battery 41 in a case where storage battery 41 is fully charged, a case where storage battery 41 is in the state of being not chargeable with the amount of electric power generated by solar panel 22, or some other case.

In Step S12, when controlling CPU 46 determines to continue to charge storage battery 41, the processing goes to Step S13, and charging converter 43 outputs electric power with set output voltage Vo1 to charge storage battery 41.

Here, as described with reference to FIGS. 3A and 3B, when storage battery 41 is charged with output voltage Vo1, solar panel 11 can be activated at two operation points P1 and P2 being on the voltage current curve of solar panel 11. Charging converter 43 takes electric power out of solar panel 22 while scanning (changing) input voltage Vi on a large scale, and detects operation points P1 and P2 where output voltage Vo becomes output voltage Vo1. Then, charging converter 43 performs PWM (Pulse Width Modulation) control on a switching element in largely different two patterns, and takes electric power out of solar panel 11 while regularly switching operation points P1 and P2.

That is, in Step S13, charging converter 43 takes electric power out of solar panel 11 while regularly switching operation points P1 and P2 which are defined by set output voltage Vo1, and outputs the electric power with output voltage Vo1, to charge storage battery 41.

In Step S14, concerning two operation points P1 and P2 where charging converter 43 takes electric power out of solar panel 22, controlling CPU 46 calculates voltage difference ΔVi between input voltage Vi1 of operation point P1 and input voltage Vi2 of operation point P2.

In Step S15, controlling CPU 46 determines whether or not voltage difference ΔVi between input voltage Vi1 and input voltage Vi2 is equal to or larger than allowable input voltage difference Va. Here, allowable input voltage difference Va is a value which is previously set such that output voltage Vo1 is decreased as voltage difference ΔVi becomes smaller than this voltage difference.

In Step S15, when controlling CPU 46 determines that voltage difference ΔVi between input voltage Vi1 of operation point P1 and input voltage Vi2 of operation point P2 is smaller than allowable input voltage difference Va, the processing goes to Step S16.

In Step S16, controlling CPU 46 performs processing of decreasing output voltage Vo1 of charging converter 43. That is, in this case, since voltage difference ΔVi between input voltage Vi1 and input voltage Vi2 is small and close to maximum operation point P_max of solar panel 22, the curve shown by: input current li=variable a/input voltage Vi, is shifted in a lower left direction of FIG. 4A. For example, controlling CPU 46 sets output voltage Vo1, which is outputted by charging converter 43 to storage battery 41, to a value (Vo1=Vo1−ΔV1) obtained by subtracting voltage step width ΔV1 from output voltage Vo1 currently set in charging converter 43. Here, voltage step width ΔV1 is a value previously set as an adjustment amount in the case of performing such adjustment as to decrease the output voltage.

On the other hand, in Step S15, when controlling CPU 46 determines that voltage difference ΔVi between input voltage Vi1 and input voltage Vi2 is equal to or larger than allowable input voltage difference Va, the processing goes to Step S17.

In Step S17, controlling CPU 46 determines whether or not voltage difference ΔVi between input voltage Vi1 and input voltage Vi2 is equal to or smaller than buffer input voltage difference Vb. Here, buffer input voltage difference Vb is a value which is previously set such that the output voltage is increased as the voltage difference becomes larger than this voltage difference.

In Step S17, when controlling CPU 46 determines that voltage difference ΔVi between input voltage Vi1 and input voltage Vi2 is larger than buffer input voltage difference Vb, the processing goes to Step S18.

In Step S18, controlling CPU 46 performs processing of increasing output voltage Vo1 of charging converter 43. That is, in this case, since voltage difference ΔVi between input voltage Vi1 and input voltage Vi2 is large and far from maximum operation point P_max of solar panel 22, the curve shown by: input current li=variable a/input voltage Vi, is shifted in an upper right direction of FIG. 4A. For example, controlling CPU 46 sets output voltage Vo1, which is outputted by charging converter 43 to storage battery 41, to a value (Vo1=Vo1 +ΔV2) obtained by adding voltage step width ΔV2 to output voltage Vo1 currently set in charging converter 43. Here, voltage step width ΔV2 is a value previously set as an adjustment amount in the case of performing such adjustment as to increase the output voltage.

On the other hand, in Step S17, when controlling CPU 46 determines that voltage difference ΔVi between input voltage Vi1 and input voltage Vi2 is equal to or smaller than buffer input voltage difference Vb, the processing goes to Step S19. That is, in this case, voltage difference ΔVi between input voltage Vi1 and input voltage Vi2 is within an appropriate predetermined range defined by allowable input voltage difference Va and buffer input voltage difference Vb.

In Step S19, controlling CPU 46 holds output voltage Vo1 of charging converter 43 at the currently set value.

Further, after the processing of Steps S16, S18 or S19, the processing returns to Step S12, and the same processing is performed hereinafter.

Then in Step S12, when controlling CPU 46 determines not to continue to charge storage battery 41, the processing is completed.

As thus described, in charge control device 25, output voltage Vo1 is adjusted so as to be in the vicinity of maximum operation point P_max in accordance with voltage difference ΔVi between input voltage Vi1 and input voltage Vi2. This allows more efficient charging. Further, operation points P1 and P2 are avoided coming into the state of not existing, thereby to avoid the operation of solar panel 11 becoming unstable.

Figure 10:
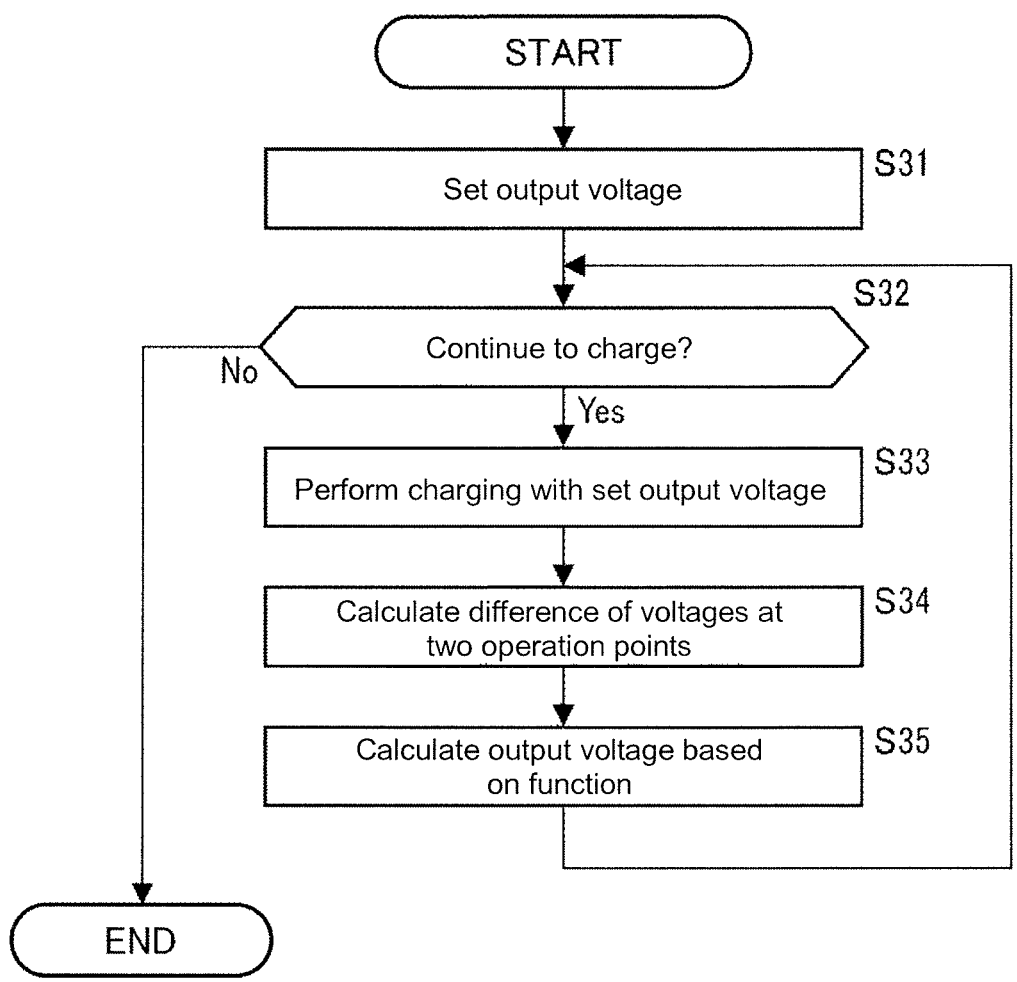
FIG. 10 is a flowchart explaining processing by a second charging method.

FIG. 10 is a flowchart explaining processing by a second charging method by means of charging converter 43.

In Steps S31 to S34, the same processing as in Steps S11 to S14 of FIG. 9 are performed, and controlling CPU 46 calculates voltage difference ΔVi between input voltages Vi1 and Vi2 corresponding to operation points P1 and P2, respectively, which are defined by set output voltage Vo1.

In Step S35, controlling CPU 46 calculates adjustment amount F(ΔVi) for adjusting an output voltage based on a previously set function of voltage difference ΔVi. Then, controlling CPU 46 sets output voltage Vo1, which is outputted by charging converter 43 to storage battery 41, to a value (Vo1=Vo1+F(ΔVi)) obtained by adding adjustment amount F(ΔVi) to output voltage Vo1 currently set in charging converter 43.

Here, adjustment amount F(ΔVi) can be obtained with a mathematical formula expressed by: $F(\Delta Vi) = \alpha \times \Delta Vi^3 + \beta \times \Delta Vi + \gamma$ with coefficient α, coefficient β and coefficient γ set to appropriate coefficients by learning in accordance with the state of sunlight irradiation, for example.

As described above, in charge control device 25, output voltage Vo1 is adjusted by adjustment amount F(ΔVi) which is calculated based on the function of voltage difference ΔVi, thereby to allow more efficient charging.

Figure 11:
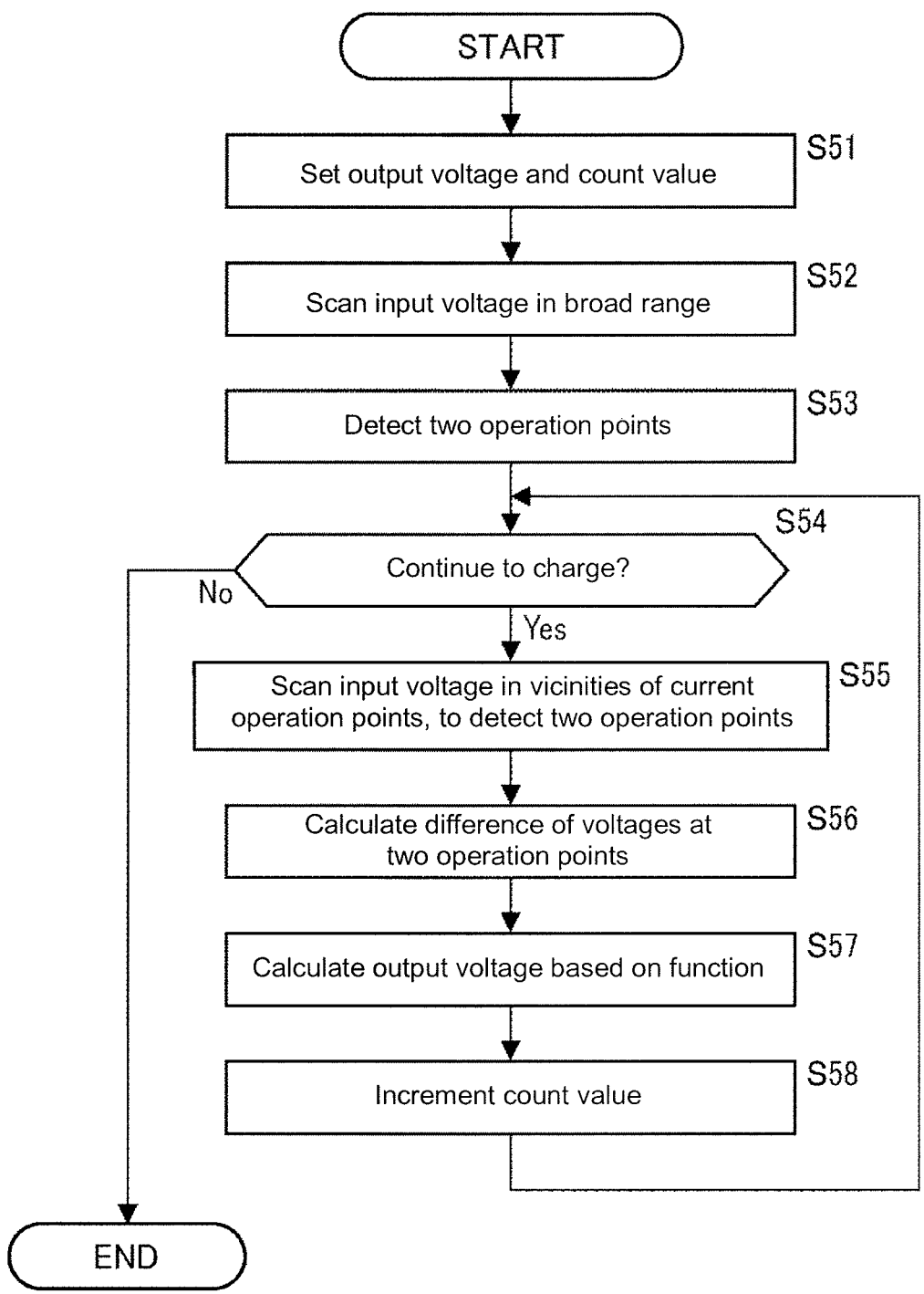
FIG. 11 is a flowchart explaining processing by a third charging method.

FIG. 11 is a flowchart explaining processing by a third charging method by means of charging converter 43.

In Step S51, controlling CPU 46 decides output voltage Vo1 which is outputted by charging converter 43 to storage battery 41, and sets it in charging converter 43. Further, controlling CPU 46 sets predetermined count value n to 1 as an initial value.

In Step S52, charging converter 43 takes electric power out of solar panel 22 while scanning input voltage Vi in a broad range.

In Step S53, charging converter 43 detects operation points P1 and P2 where output voltage Vo becomes output voltage Vo1.

In step S54, controlling CPU 46 determines whether or not to continue to charge storage battery 41, and when it determines to continue to charge storage battery 41, the processing goes to Step S55.

In Step S55, input voltage Vi is scanned in the vicinities of input voltages Vi1 and Vi2 corresponding to current operation points P1 and P2, to newly detect operation points P1 and P2 where output voltage Vo becomes output voltage Vo1. It is to be noted that the processing of Step S55 is skipped in the case of count value n being 1, and is performed only in the case of count value n being other than 1.

In Steps S56 and S57, as in Steps S34 and S35 of FIG. 10, controlling CPU 46 calculates voltage difference ΔVi between input voltage Vi1 and input voltage Vi2, and calculates adjustment amount F(ΔVi) for adjusting an output voltage, to adjust output voltage Vo1.

In Step S58, controlling CPU 46 increments count value n (n=n+1), and the processing returns to Step S54. The same processing is repeated hereinafter.

As described above, in charge control device 25, after detection of operation points P1 and P2, input voltage Vi is scanned in the vicinities of input voltages Vi1 and Vi2, thereby to newly detect operation points P1 and P2. Hence the scanning range of input voltage Vi may be narrow, thus allowing more efficient adjustment of output voltage Vo1.

It is to be noted that the present technique is applicable to, other than the system for charging electric power generated by solar panel 22 into storage battery 41, a system for charging into storage battery 41 electric power generated by a variety of electric power generation units (dispersed power supplies) such as wind power generation, a fuel cell and cogeneration. It is thus possible to perform charging by the same control method as solar panel 22. Further, the present technique may be applied to a system with those electric power generation units combined.

It is to be noted that each processing described with reference to the foregoing flowchart need not necessarily be performed in a time-series order along the sequence described as the flowchart. The processing includes processing that is executed in parallel or individually (e.g., parallel processing or processing by means of an object).

It is to be noted that the present embodiment is not restricted to the foregoing embodiments, and a variety of modifications can be made in a range not deviating from the gist of the present disclosure.

What is claimed is:
1. A charging control device, comprising:
a converter configured to take electric power out of an electric power generator that generates electric power, and configured to convert the electric power to a voltage required for charging a storage battery; and
an adjuster configured to adjust an output voltage output from the converter,
wherein
the converter takes electric power out of the electric power generator at two operation points where the electric power can be taken out of the electric power generator with the output voltage adjusted by the adjuster and output from the converter, and charges the storage battery,
wherein the two operation points are defined by intersection points between a voltage-current curve of the electric power generator and a curve defined by $Ii = a/Vi$ and $a = Vo \times Io/\eta$,
where Ii is an input current input from the electric power generator into the convertor,
Vi is an input voltage input from the electric power generator into the converter,
Io is an output current of the converter,
Vo is the output voltage that is output from the converter, and

η is a conversion efficiency of the converter,
wherein the converter determines the two operation points by scanning the input voltage, and
wherein the adjuster adjusts the output voltage in accordance with a voltage difference between the input voltages respectively corresponding to the two operation points.

2. The charging control device according to claim 1, wherein the adjuster adjusts the output voltage in accordance with a predetermined function with the voltage difference between the input voltages regarded as a variable.

3. The charging control device according to claim 1, wherein the adjuster adjusts the output voltage so as to
decrease the output voltage when the voltage difference between the input voltages is smaller than a first set value, and
increase the output voltage when the voltage difference between the input voltages is larger than a second set value.

4. The charging control device according to claim 1, wherein the converter scans the input voltage of the electric power that is taken out of the electric power generator, to detect the two operation points, at which the output voltage becomes the output voltage adjusted by the adjuster.

5. The charging control device according to claim 4, wherein, after detecting the two operation points, the converter repeats processing of changing the input voltage of the electric power that is taken out of the electric power generator in the vicinities of the input voltages corresponding to the two operation points and newly detecting two operation points to adjust the output voltage.

6. The charging control device according to claim 1, wherein only the converter is disposed to convert electric power, on wiring that connects the electric power generator and the storage battery at the time of charging the electric power generated by the electric power generator into the storage battery.

7. A solar power generation system, comprising the charging control device according to claim 1, wherein the converter takes the electric power of the generator configured as a solar panel, which generates electric power in accordance with irradiation by sunlight.

8. A charging control method for a charging control device which includes a converter configured to take electric power out of an electric power generator that generates electric power, and configured to convert the electric power to a voltage required for charging a storage battery, and an adjuster configured to adjust an output voltage output from the converter, the method comprising:
taking, by the converter, electric power out of the electric power generator at two operation points where the electric power can be taken out of the electric power generator with the output voltage adjusted by the adjuster and output from the converter; and
charging, by the converter, the storage battery,
wherein the two operation points are defined by intersection points between a voltage-current curve of the electric power generator and a curve defined by $Ii=a/Vi$,
where $a = Vo \times Io/\eta$,
Ii is an input current input from the electric power generator into the convertor,
Vi is an input voltage input from the electric power generator into the converter,
Io is an output current of the converter,
Vo is the output voltage that is output from the converter, and
η is a conversion efficiency of the converter,
the method further comprising:
determining, by the converter, the two operation points by scanning the input voltage; and
adjusting, by the adjuster, the output voltage in accordance with a voltage difference between the input voltages respectively corresponding to the two operation points.

* * * * *